UNITED STATES PATENT OFFICE.

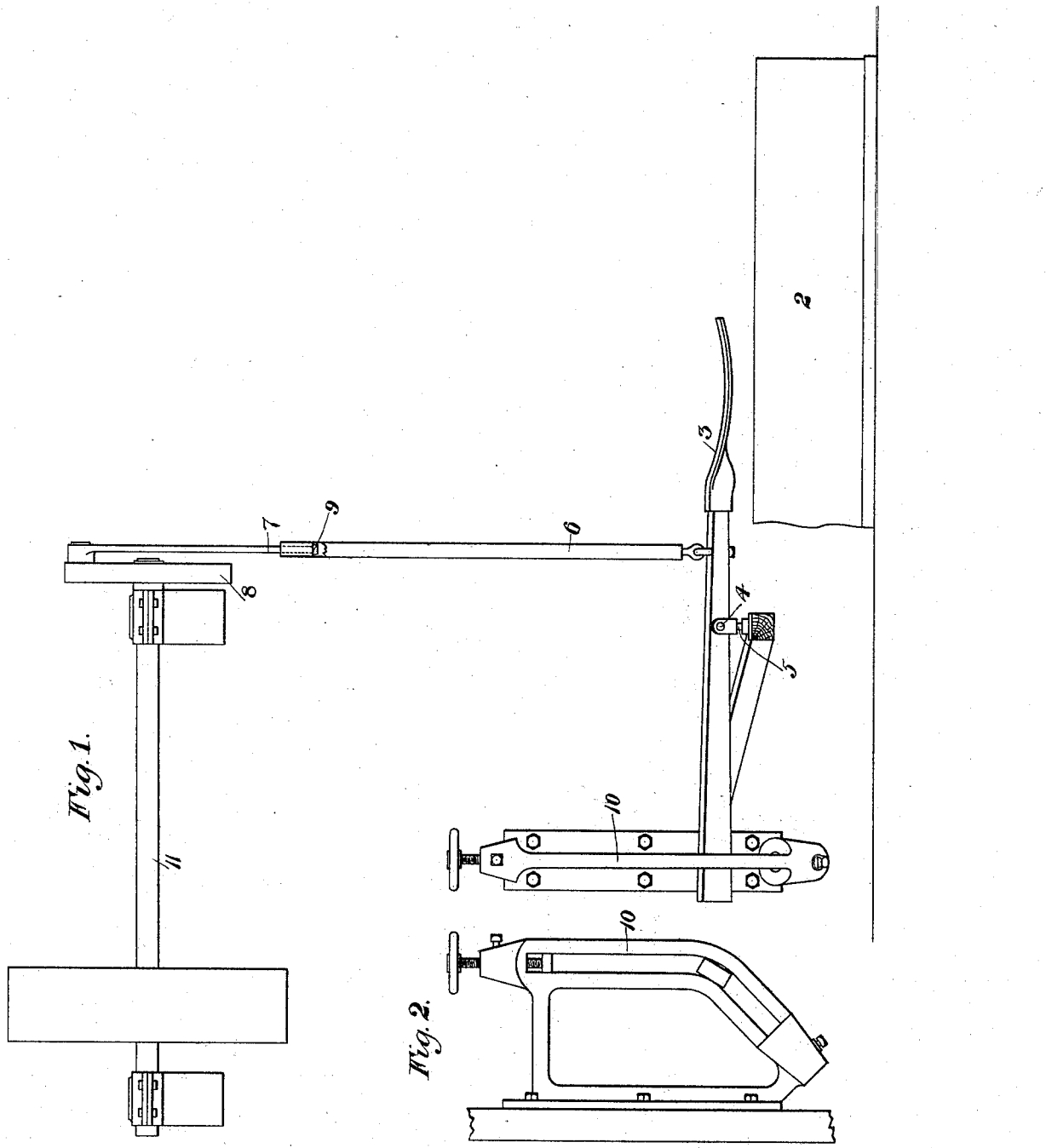

EMET S. FICKES, OF CALUMET, ASSIGNOR TO STEVENSON & CO., OF WELLSVILLE, OHIO.

PAN-EMPTYING MACHINE.

SPECIFICATION forming part of Letters Patent No. 544,911, dated August 20, 1895.

Application filed October 5, 1892. Serial No. 447,883. (No model.)

*To all whom it may concern:*

Be it known that I, EMET S. FICKES, of Calumet, in the county of Jefferson and State of Ohio, have invented a new and useful Improvement in Pan-Emptying Machines, of which the following is a full, clear, and exact description, reference being had to the accompanying drawings, forming part of this specification, in which—

Figure 1 is a side elevation of my improved pan-emptying machine, and Fig. 2 is an end view showing the means for ejecting the material from the shovel.

My invention relates to means for clearing out the material which is ground up in rotary pans; and it consists in improved means whereby hand labor is done away with and the pan is quickly and easily emptied while in motion.

In the accompanying drawings, 2 represents the grinding-pan, which is partially broken away to show the operating mechanism.

3 is a shovel pivoted at 4 by a swivel-joint 5. Pivotally connected with the shovel near its working end is a hollow cylinder 6, within which moves the rod 7, connected at one end with the crank 8 and provided at the other end with an elargement or boss 9, which engages a collar inserted in the upper end of the hollow cylinder, as shown. The outer end of the shovel-handle passes through a slotted guide 10, which for a portion of its length is vertical, while the lower part is curved. This guide is bolted to a suitable support, as shown, and as the shovel is lowered the handle rises and is guided in the vertical portion of the guide, the material being thrust upon the shovel by the rotary motion of the pan. When, however, the shovel rises the handle passes into the curved portion of the slot and the shovel is tipped, thus throwing out its contents into a suitable receptacle placed near the pan. The shaft 11, carrying the crank, is revolved at the rate of about forty revolutions per minute, and as it revolves the material is automatically removed from the pan, as above described.

The advantages of my construction are obvious. The device is simple and not liable to get out of order, while its operation is sure and entirely automatic.

Many changes may be made in the form and arrangement of the parts without departing from my invention, since

What I claim is—

1. A pan-emptying machine comprising a pivoted shovel, a connection between the shovel and a moving part, said connection being arranged to raise and lower the shovel at determined intervals, and means for automatically tipping the shovel each time that it is raised; substantially as described.

2. A pan-emptying machine comprising a pivoted shovel, a crank and connecting rod arranged to raise the shovel at determined intervals, and a guide arranged to tip the shovel at each upward motion thereof; substantially as described.

3. A pan-emptying machine, comprising a pivoted shovel, a crank and connecting rod arranged to raise and lower the same, and a slotted guide through which the handle projects, said slot being curved for a portion of its length; substantially as and for the purposes described.

In testimony whereof I have hereunto set my hand this 29th day of September, A. D. 1892.

EMET S. FICKES.

Witnesses:
FRED W. LAHAN,
JOHN A. BURCHFIELD.